United States Patent
Coe

(10) Patent No.: US 6,431,317 B1
(45) Date of Patent: Aug. 13, 2002

(54) ROTARY ELECTRIC ACTUATOR WITH A MECHANICAL SPRING RETURN BACK-UP

(75) Inventor: Thomas Edward Coe, Raymond, NH (US)

(73) Assignee: Valvcon Corporation, Milford, NH (US)

(*) Notice: Subject to any disclaimer, the term of this patent is extended or adjusted under 35 U.S.C. 154(b) by 8 days.

(21) Appl. No.: 09/636,622

(22) Filed: Aug. 11, 2000

Related U.S. Application Data

(60) Provisional application No. 60/148,602, filed on Aug. 12, 1999, and provisional application No. 60/213,035, filed on Jun. 21, 2000.

(51) Int. Cl.$^7$ .............................. F03G 1/08; F03G 1/00; F16D 21/02
(52) U.S. Cl. ................... 185/40 R; 74/398; 74/405; 74/425; 185/38; 185/43; 192/48.91; 192/69.62; 192/93 A; 251/69
(58) Field of Search .................. 74/396, 398, 405, 74/425; 185/11, 38, 40 R, 43; 192/48.91, 69.62, 93 A; 251/69

(56) References Cited

U.S. PATENT DOCUMENTS

| | | | | |
|---|---|---|---|---|
| 3,889,924 A | * | 6/1975 | Karpenko | 185/40 R |
| 4,019,586 A | * | 4/1977 | Hauser | 192/48.91 |
| 4,132,284 A | * | 1/1979 | Tomecek | 123/396 |
| 4,287,428 A | * | 9/1981 | Smith | 185/11 |
| 4,621,789 A | * | 11/1986 | Fukamachi | 185/40 R |
| 4,683,770 A | * | 8/1987 | Nettmann | 74/405 |
| 5,865,272 A | * | 2/1999 | Wiggins et al. | 185/40 R |

\* cited by examiner

*Primary Examiner*—Allan D. Herrmann
(74) *Attorney, Agent, or Firm*—Davis & Bujold, P.L.L.C.

(57) ABSTRACT

A tri-modal—energy storage mode, fail-safe mode, and operating mode—fail-safe actuator with low overall power consumption and specifically low fail-safe power consumption due to energy storage pawling mechanisms. Stored energy is discharged at a controlled rate in fail-safe mode. The actuator's sequencing through its three modes is enabled by a dual-cam/clutch system which is powered separately from the operational (shaft control) system.

20 Claims, 16 Drawing Sheets

ROTARY ELECTRIC ACTUATOR WITH A MECHANICAL SPRING RETURN BACK-UP

CROSS-REFERENCE TO RELATED APPLICATIONS

This application claims priority for all similar material that is part of the following Provisional Patent Applications: ROTARY ELECTRIC ACTUATOR WITH A MECHANICAL SPRING RETURN BACK-UP, Ser. No. 60/148,602, inventor Thomas Edward Coe, filed on Aug. 12, 1999; and IMPROVEMENTS TO ROTARY ELECTRIC ACTUATOR WITH A MECHANICAL SPRING RETURN BACK-UP, Ser. No. 60/213,035, inventor Thomas Edward Coe, filed on Jun. 21, 2000.

STATEMENT REGARDING FEDERALLY SPONSORED RESEARCH OR DEVELOPMENT

Not Applicable.

BACKGROUND OF THE INVENTION

1. Field of the Invention

This invention relates generally to electrically powered fail-safe actuators for use in a variety of rotary control devices, such as valves and dampers.

2. Description of Related Art

Electric actuators can be used in industrial applications to control full clockwise and counterclockwise positioning, and usually strive for the following characteristics:

high torque per volume;

reliability;

improved control of the speed of the device; and reduced energy consumption.

Current technology aimed at providing an actuator with these features is described below. All current technology lacks critical features as outlined below that are provided by the instant invention and described in this application.

Fail-safe operation in an actuator is activated when power loss or other external failure condition causes the actuator, without benefit of external electric power, to move the valve to a pre-determined position. To achieve adequate torque, this requirement on an actuator usually necessitates an increase in volume, thus reducing the torque/volume ratio. Fail-safe actuation has been approached in several ways. Some approaches involve an energy storage means such as a spring that is used to move the valve or damper to a certain position when a prespecified condition or set of conditions occurs. U.S. Pat. No. RE30,135 discloses an electric fail-safe actuator that employs a spring which is wound to store energy during operation of the electric drive motor, and an electric clutch operable to disengage the drive motor from the actuator output shaft in response to loss of power from the electrical supply whereby the spring drives the valve in the opposite direction. This device depends on an electric clutch means for switching to power-fail mode. U.S. Pat. No. 5,915,668 discloses a valve actuating apparatus including an actuator having a spring connected to the valve control arm or the clutch assembly for normally biasing the clutch assembly to a first position along the guide member such that the valve control arm is in the closed position. Upon interruption of power, the spring forces the engagement member of the clutch assembly out of engagement with the detent in the guide member and the spring forces the clutch assembly to slide back along the guide member to the first position and rotates the valve control arm to the closed position. In this case, the power-fail spring is forcing the clutch assembly, not the valve control shaft.

U.S. Pat. No. 4,595,081 discloses an electric motor that rotates a valve shaft one direction and a spring which is wound during driving of the shaft by the motor. The motor drives the output shaft and winds the return spring by way of a speed-reducing, torque amplifying gear train. To enable the use of a lighter return spring and the use of a gear train effecting greater torque amplification from the motor to the output shaft, intermediate gears in the drive train apply winding torque to the return spring differentially of the drive torque applied to the output shaft. This device requires intermediate gears and the time differential to switch between the gears. U.S. Pat. No. 5,662,542 discloses an actuating drive with a spring return feature including an electric drive, a reduction gearing having a return spring tensionable by the actuating movement and serving for the spring return movement, a clutch between the electric drive and the reduction gearing and a centrifugal brake device actuated during the spring return movement.

Devices that could effect fail-safe actuation without a spring rely on bias force and clutch mechanisms. For example, U.S. Pat. No. 5,988,319 discloses an apparatus for effecting actuation of a device having a home position and a set position. The apparatus returns the device to the home position upon loss of power to the apparatus. In this invention, a bias member having a cocking mechanism and a release mechanism is disclosed as the preferred embodiment. The bias member provides a bias force to a bias shaft when the cocking mechanism is cocked and the release mechanism is released; the release mechanism is released when power is lost to the actuator. U.S. Pat. No. 4,533,114 discloses an actuator for a rotary valve including a fail-safe mechanism for automatically opening or closing the valve upon the occurrence of a predetermined condition, and for allowing manual operation of the valve. A biased clutch activates the fail-safe mechanism and also couples a worm-gear drive for effecting the manual operation of the valve.

Of foremost concern in actuator design is reducing the physical size of an actuator while maintaining or increasing its torque output. This can be accomplished by novel design and engineering of the component parts of the actuator. One critical component of the electric actuator is the clutching-declutching mechanism, the size and efficiency of which is crucial to actuator torque/volume output. Current technology for clutching mechanisms comprises intermediate gears to effectuate continuous operation between gear changes. U.S. Pat. No. 5,490,433 discloses a transmission subunit with an intermediate shaft having continuous gears of progressive pitch diameters (ramp gears) interposed between pairs of conventional gears. The geometry of the continuous gears permits input gears, output gears, and/or idler gears to freely and independently slide longitudinally the length of the intermediate shaft without disengaging. Helical or spur cut gears can be used throughout. During shifting, an idler quickly passes from a conventional gear to an intermediate, continuous gear where it changes speed ratio progressively until the new ratio is achieved. At this point the idler quickly moves on to the next conventional gear to complete the shift cycle. An automatic locking mechanism assures precise, fixed alignment. This invention requires the presence of ramp gears to implement shift continuity, a requirement that adds volume and reduces torque output because of idle time during gear changes. In addition, torque output is further reduced by clutch pin friction and pin alignment delay.

Reliability in electric actuators has to do with downtime due to failure which is, in part, determined by the actuator's ease of maintainability. Easy to maintain actuators reduce net downtime and thus increase reliability. Reducing actuator complexity is one way to reduce downtime. Highly complex actuators interweave sequencing and operational activities and drive them with the same motor. With these types of devices, isolating a failure, either while testing the device or during operations, can be difficult due to the complex operational sequences required to accomplish actuation. In addition, maintaining such a device can be more complex. Dividing functionality to simplify individual sequences is one way to reduce complexity. The current technology usually comprises one motor that drives both the sequencing of operations in the actuator as well as the output of the actuator. For example, U.S. Pat. No. 5,195,721 discloses a fail safe valve actuator that is powered by an electric motor. A valve stem with a helical groove is moved in one direction by a ball nut rotated by the electric motor to move a valve member to its operating position. The valve member is held in operating position by a solenoid. When power fails, a spring moves the valve stem in the other direction to move the valve member to its fail safe position. In this device, a centrifugal brake is required to limit torque to protect the electric motor from the high torque created when the valve stem abruptly stops moving when the valve member reaches its operating position and when the power fails and the valve stem is moved rapidly to its fail safe position by the spring. Also, energy to power the fail-safe mode is usually stored during normal operation and released upon detection of the condition. The current technology in most fail-safe mechanisms for electric valve actuators requires that the stored energy be maintained by a constant power supply, for example, U.S. Pat. No. 5,195,721. In this invention, a compression spring is used, versus a power spring, and the fail-safe spring is maintained in position by a solenoid, requiring around, but less than, 20 watts of power.

The patents noted herein provide information regarding the developments that have taken place in the field of fail-safe electric actuator technology. Clearly the instant invention provides many advantages over the prior art inventions noted above. Again it is noted that the invention, in comparison with prior art rotary fail-safe electric actuation, provides the following advantages:

higher torque/volume ratio;

improved simplicity of operation and maintenance increased speed control; and reduced power consumption to maintain fail-safe mode.

BRIEF SUMMARY OF THE INVENTION

An actuator that provides increased torque/volume ratio, improved simplicity of maintenance and repair, increased speed control, and reduced power consumption to maintain fail-safe mode is disclosed. To increase the torque/volume ratio during normal and fail-safe operations, a novel clutching mechanism that enables three separate actuator modes is disclosed. To reduce complexity in maintaining and repairing the actuator, a dual motor system and the use of power springs are disclosed. One of the motors is used for sequencing operations, and the other for controlling actuator output. And finally, to reduce power consumption for maintaining fail-safe mode, and for maintaining torque during fail-safe operation, a power spring system, pawling mechanisms, and supporting clutching system are disclosed whereby energy is stored in power springs, maintained through pawling and worm gear systems, and released during clutch-controlled failure mode operation. Energy is maintained in the power springs not by a constant energy source but by gear locking mechanisms, which allow rotation in only one direction. When in fail-safe mode, the positioning or main power spring is released at a controlled rate through the interaction of the clutching system and an escapement mechanism.

The basic function of the disclosed actuator is to direct energy flow through three separate modes of operation: energy storage mode, run mode, and fail-safe mode. During power-up, the smaller of the two motors delivers the required amount of energy to the smaller of the two power springs to achieve desired tension in the spring so that spring can be used to drive the cams which set the actuator's mode properly during fail-safe operation. This spring is later used during fail-safe operation and its stored energy is maintained through a worm gear locking mechanism. Also during power-up, the larger of the two motors delivers the required amount of energy to the larger of the two power springs, the main spring, the spring that drives the output during fail-safe operations. The stored energy in this spring is maintained through a specially-formed pawl which has a tooth positioned between gear teeth in one of the cam gears. Upon completion of energy storage, the actuator is placed into run mode. Once in run mode, the actuator is free to function normally. During a power or signal loss, the actuator is taken out of run mode and placed in fail-safe mode through the energy stored in the smaller of the two springs. This condition allows the main spring to discharge, driving the output to full clockwise or counterclockwise positioning. Each of these modes is discussed in the following paragraphs.

When power is supplied to the actuator, electronic circuitry determines the condition of the actuator. If the actuator is in low energy state, the secondary or sequencing motor drives the cam mechanism which sets the clutches properly, providing a path for energy to flow to the power springs. Energy storage continues until the tension required to rotate the main spring shaft overcomes a pre-load spring and trips a micro switch, cutting power to the motor. Energy storage is maintained as described above.

After the first micro switch has been tripped, the secondary or smaller motor continues to drive the cam mechanism in the same direction until the final position micro switch is tripped. The clutch mechanism is now providing a path for the larger motor to drive the output gear train of the actuator with the fail-safe springs fully wound and on stand-by. At this point, the actuator is operating normally.

During loss of signal or power interruption, the actuator circuitry applies reverse polarity across the solenoid, which causes the solenoid plunger to extend, with the aid of a small spring. The solenoid plunger/spring combination removes or disengages the worm from the worm wheel, which allows the smaller spring to discharge, thus forcing the cam/clutch mechanism to return to the initial low energy condition. In this position, after placing the motor gear train in a neutral position, a path is provided for the main power spring to discharge to the output of the actuator. As the spring is unwound, an escapement mechanism, which is located between the drive gear and the main spring, controls the rate of release of the energy. The escapement, a clockworks-type mechanism, rocks between the spring and drive gear, periodically engaging on its edge with the drive gear, which slows the rate of energy release from the main spring. The rate of release of the spring's energy is selectable based upon the desired reverse time of the actuator.

The dual-cam subsystem is comprised of two slotted cams, two interlocked cam gears, and two bearing cup assemblies, among other parts. The cams are hollow cylinders housing bearing cup assemblies and cam pin drivers which are attached each to the interlocking cam gears. Pins, one for each cam, which are elongated, solid, thin cylinders, are slidably inserted through cam slots, bearing cup assemblies, and cam pin drivers. The slots spiral partially up the circumference of the cams. Thus, the rotation of the interlocked cam gears causes the pins to move within the slots, among other things, and the position of the pins within the slots relative to each other indicates the actuator's mode.

Connected concentrically with the dual-cams are the dual-clutches comprised of clutch shafts, gears, pinions, and clutch bodies. Each clutch body is a disk which is slidably positioned on the clutch shaft between pinions and gears at each of the ends of the clutch shaft. Each pinion is also disk-shaped, and is fabricated with slots for accepting pins. On each face of each clutch body disk are positioned retractable is tapered pins which retract into the recesses in the clutch body upon pressure. Within the clutch body and adjacent to the base of each pin is a spring that lies between the two pins protruding from opposite sides of the clutch body disk. The pins are designed to retract only so far as the spring will allow, but far enough so that the pin will not inhibit the movement of the clutch body or pinion with respect to each other until the pin is anchored in a slot. During gear changes, the tapered pins become seated in the slots of either one of the slotted output pinions that surround the clutch assembly on the clutch assembly shaft. Because the output pinions are slotted, the tapered pins do not have to line up exactly before engaging. Also, the pins are tapered at such an angle as to reduce the force required to overcome the friction that occurs between the pins and the slots during gear changes.

Thus, the disclosed electric rotary actuator is comprised of novel components that accomplish fail-safe energy storage, controlled energy release during fail-safe operation, dual clutch and cam subsystems that provide for three separate modes of operation within a relatively small volume and with a relatively small power consumption.

It is therefore an object of the present invention to provide increased torque/volume ratio in both normal and fail-safe modes through a novel clutching mechanism, the use of power springs, and other novel design features.

Another object of the present invention is to provide an increase in reliability through reduction in complexity in operation and maintenance. Separation of functionality and control of various functions through dual motors provides decoupling of interactions and thus a reduction in the complexity of problem-solving and operational downtime. Unique design provides for some on-site maintenance, which also can reduce effective downtime.

A further object of the invention is to provide reduced power consumption required for maintaining fail-safe capability. Reduction in power consumption is accomplished through the improved way in which stored energy is maintained through pawl and worm gear mechanisms.

A further object of the invention is to provide increased speed control during positioning. This is accomplished through the novel escapement mechanism of the instant invention.

A yet still further object of the invention is to provide a design that can accommodate either DC or AC motors.

A yet still further object of the invention is to provide a design that can accommodate either a latching or non-latching solenoid.

BRIEF DESCRIPTION OF THE SEVERAL VIEWS OF THE DRAWING

These and further objects of the present invention will become apparent to is those skilled in the art after a study of the present disclosure of the invention and with reference to the accompanying drawing which is a part hereof, wherein like numerals refer to like parts throughout, and in which.

DETAILED DESCRIPTION OF THE INVENTION

Figure 1:
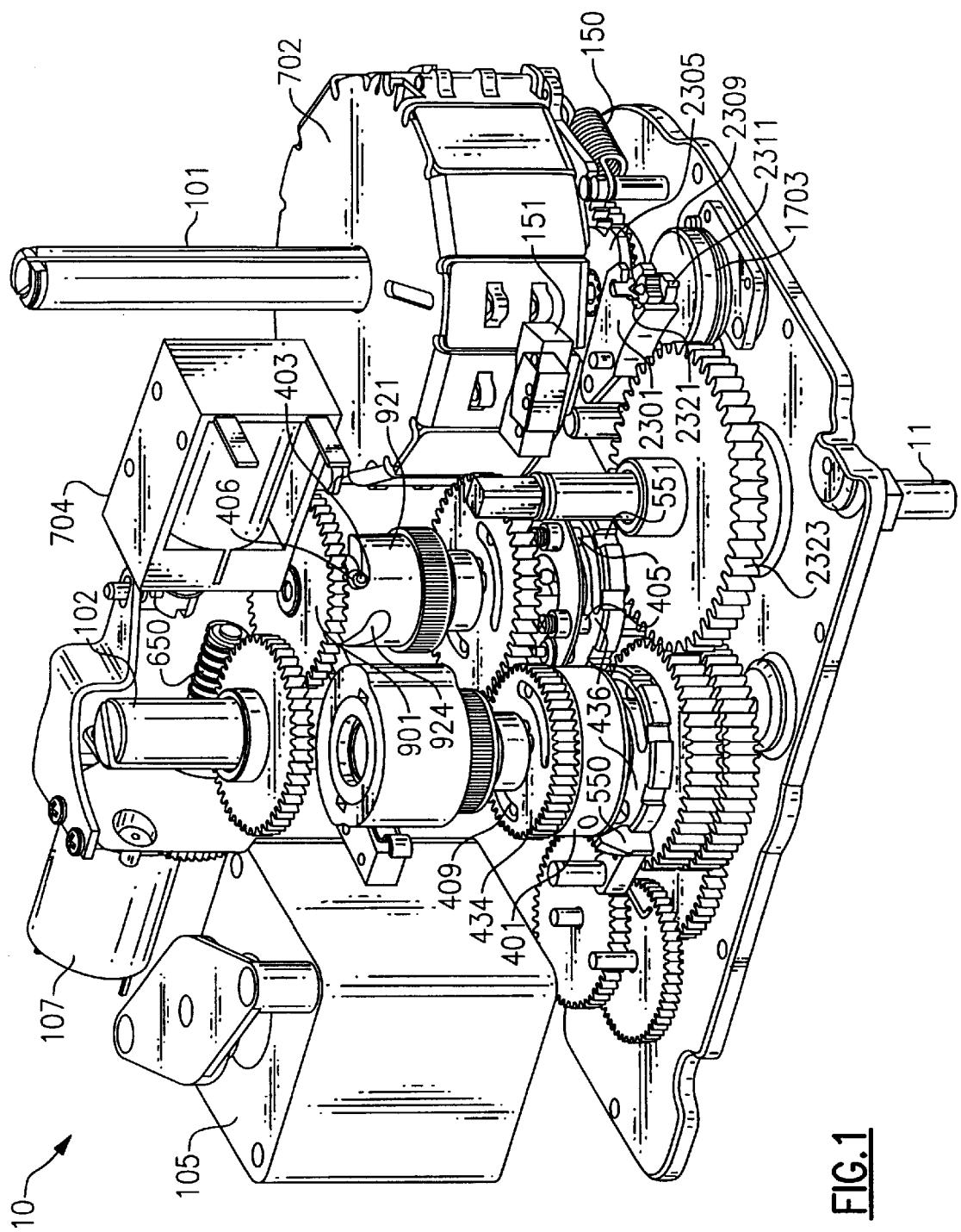
FIG. 1 is a perspective drawing of the side view of the actuator showing many of its major components.
Figure 2:
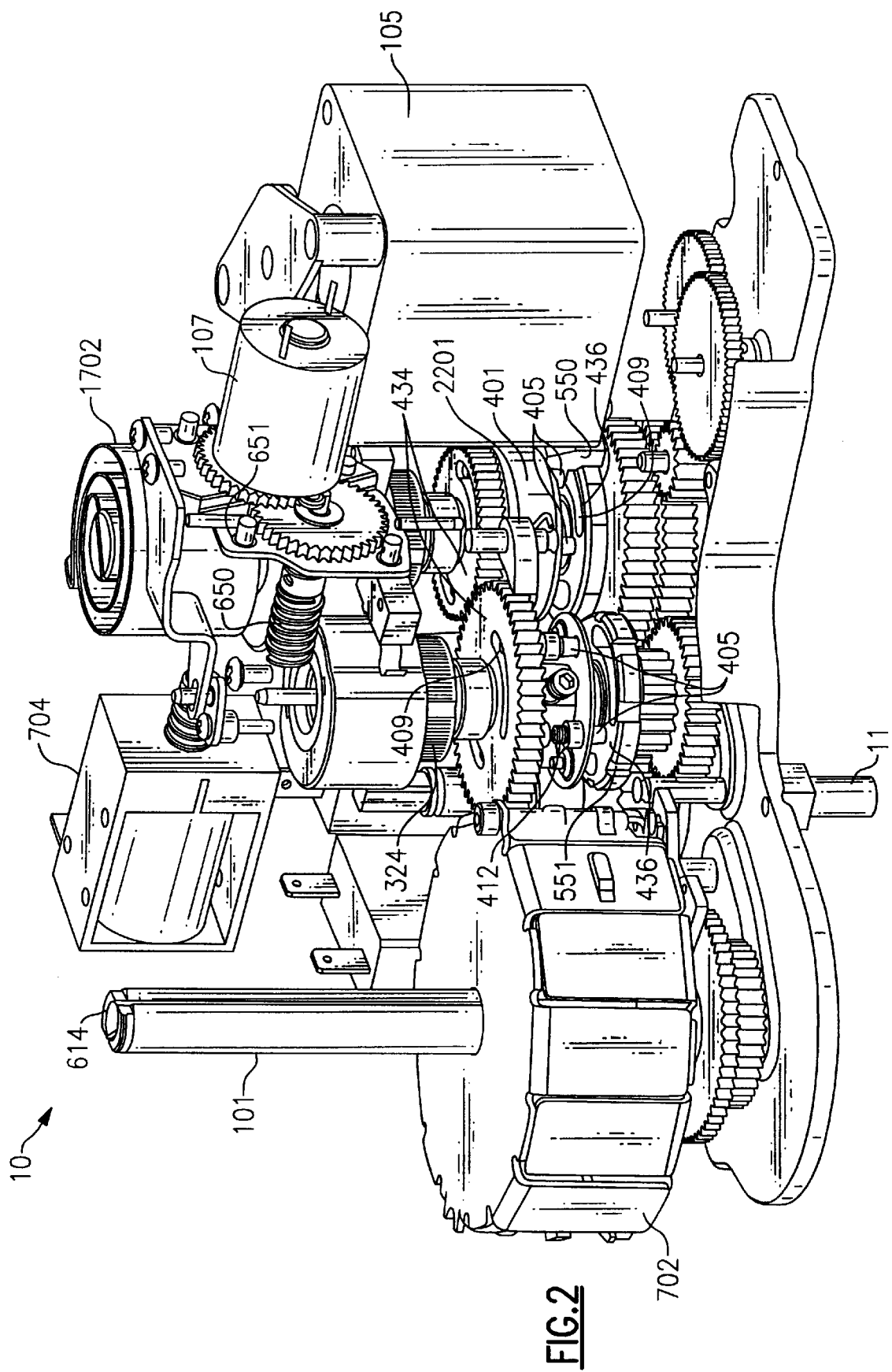
FIG. 2 is a perspective drawing of the actuator from the opposite side from FIG. 1 showing many of its major components.
Figure 3:
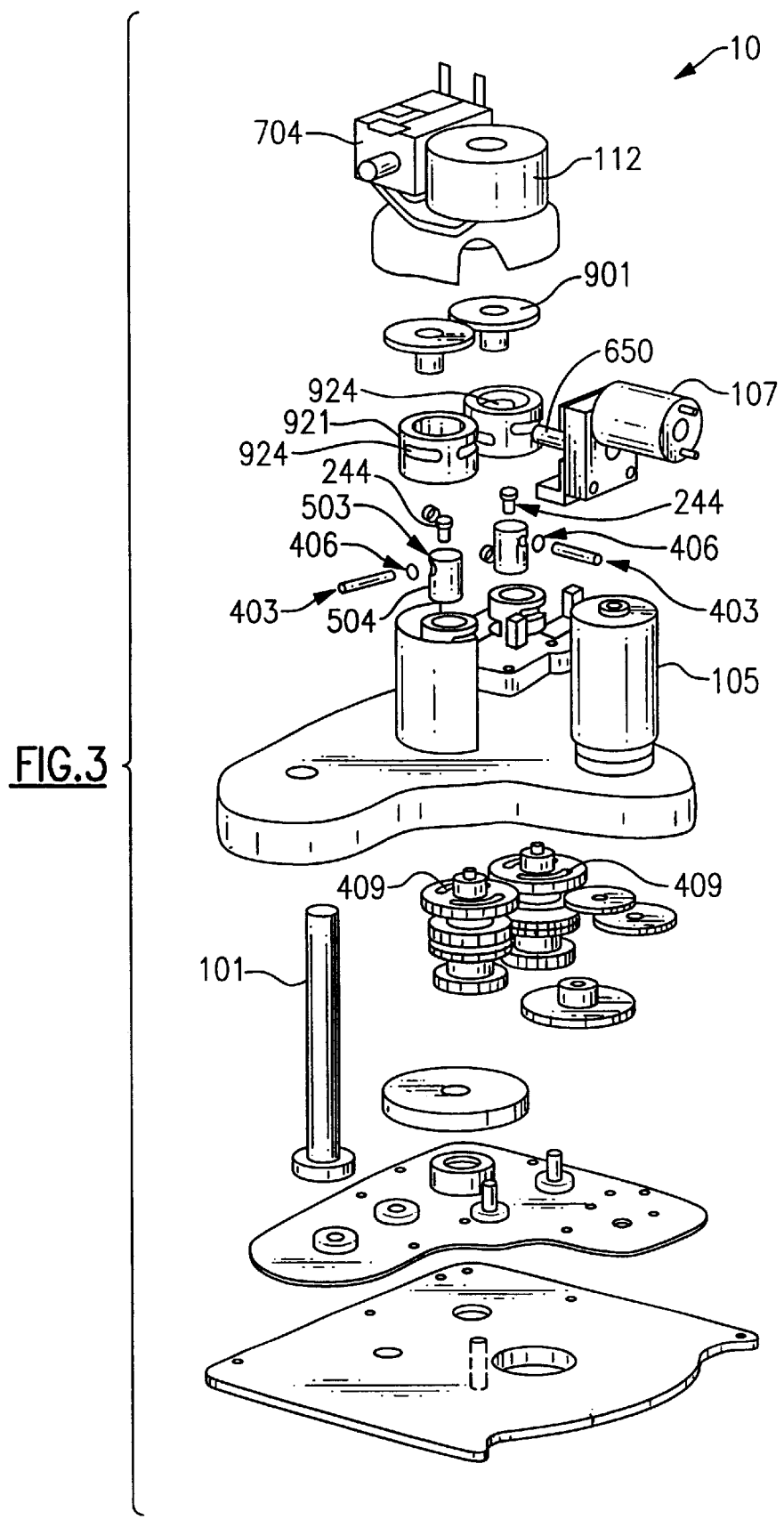
FIG. 3 is a parts diagram of most of the major components of the rotary electric actuator and their positions in relation to each other.
Figure 8:
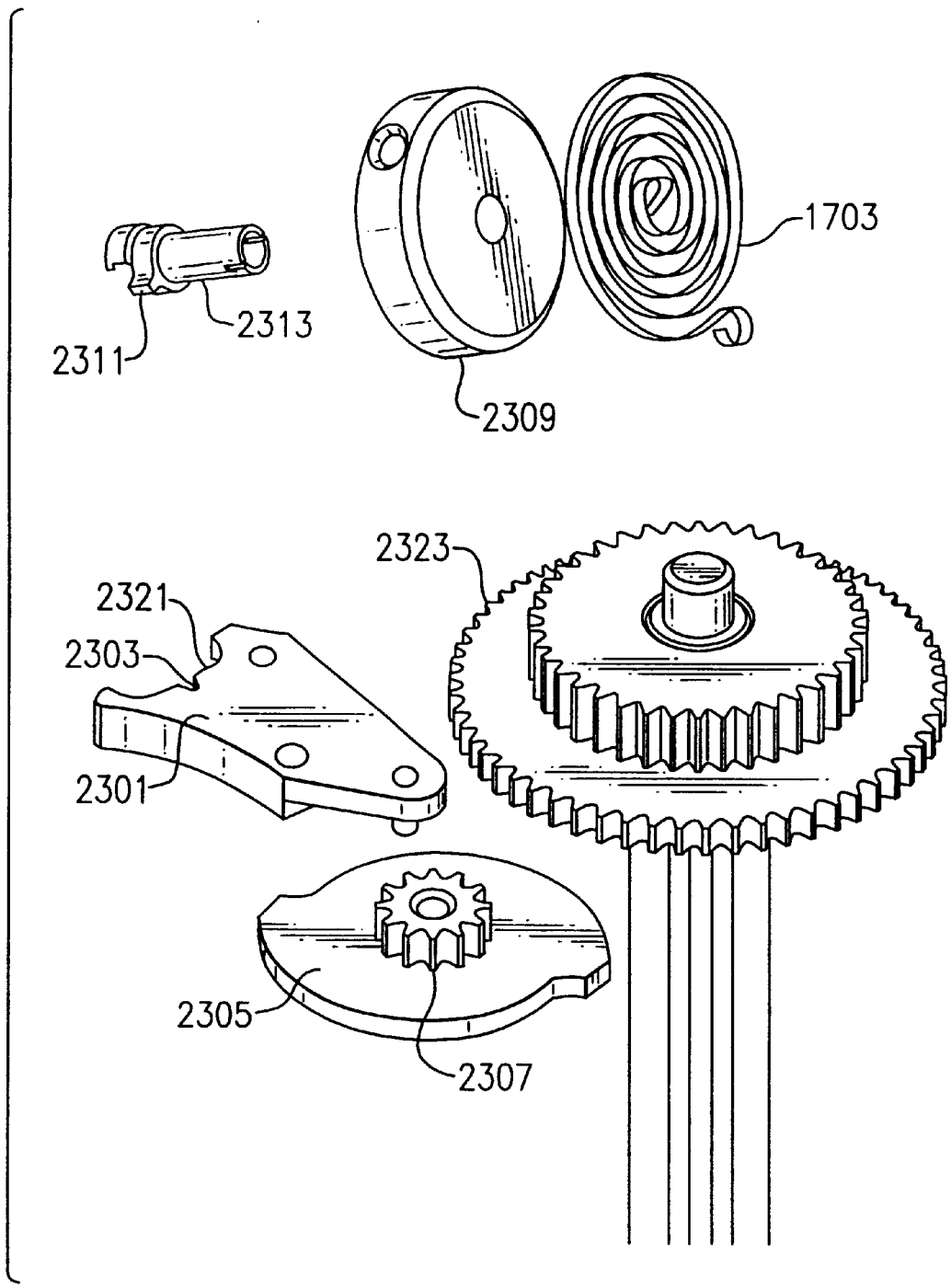
FIG. 8 shows diagrammatic views of various parts of the controlled energy release subsystem including the preferred embodiment escapement.
Figure 9:
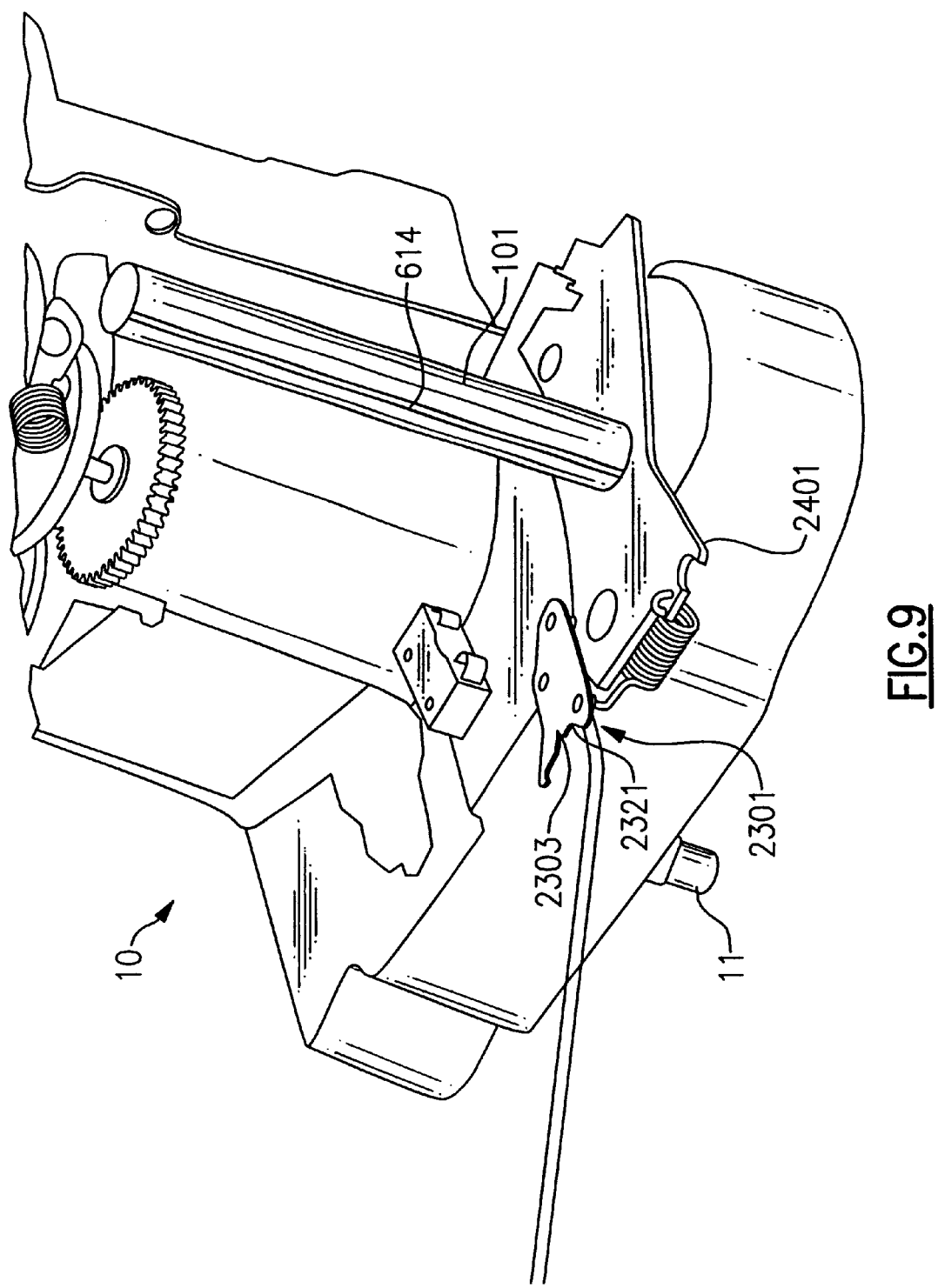
FIG. 9 is side perspective view of the preferred embodiment escapement.
Figure 10:
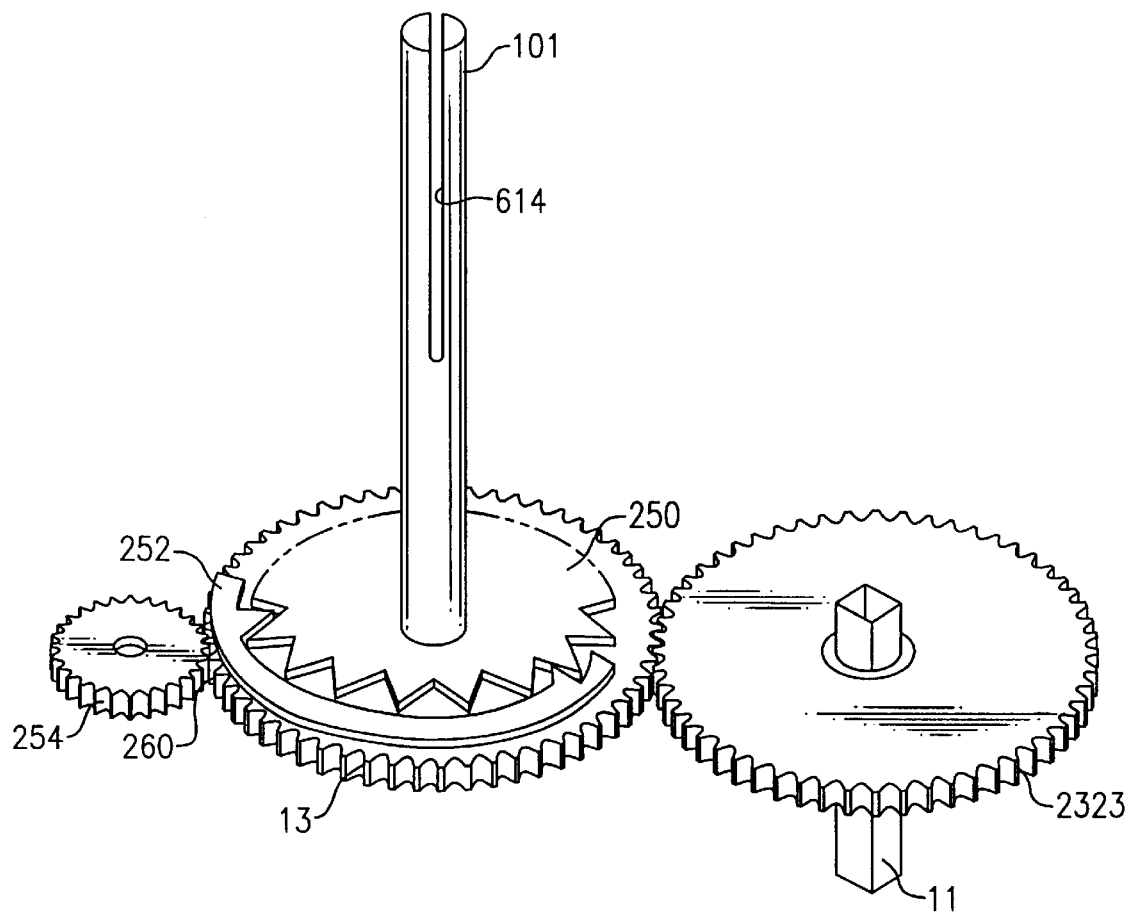
FIG. 10 illustrates a diagrammatic view of another escapement embodiment.
Figure 11:
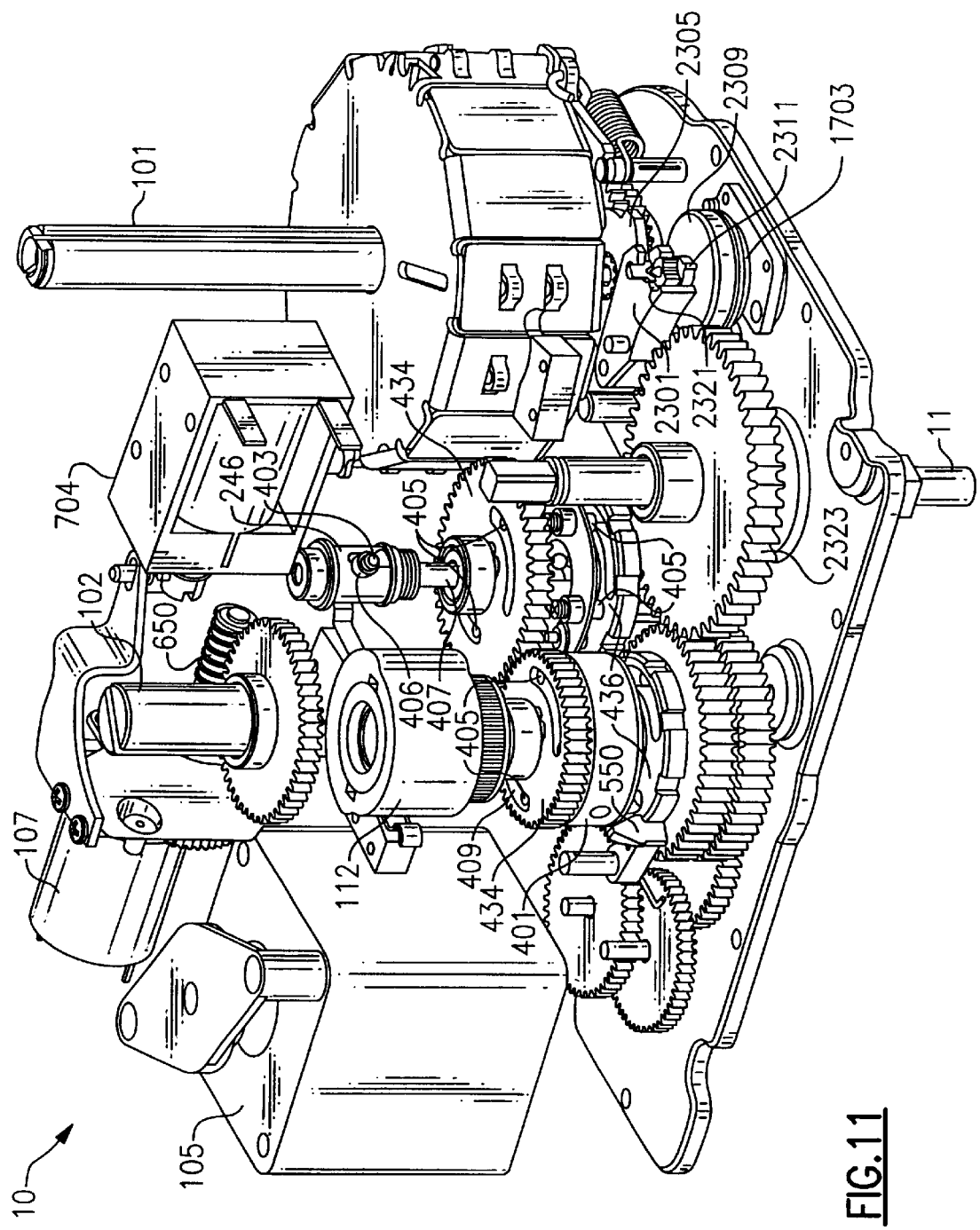
FIG. 11 is a perspective drawing from the same side view as FIG. 1 but having the bearing cup assembly exposed, i.e. having no right hand side cam gear nor cam.
Figure 12A:
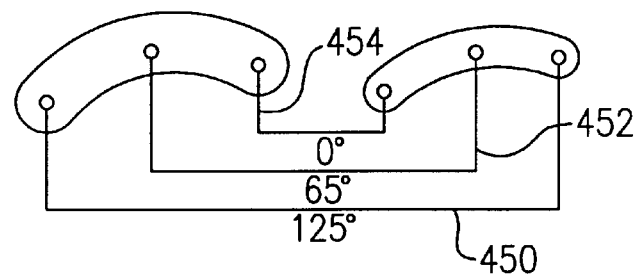
FIGS. 12A, 12B, and 12C are diagrams of the configuration of clutch pin within the cam slot when the actuator is in its various modes, and perspective views of the side-by-side cams and the bearing cup assembly respectively.
Figure 12B:
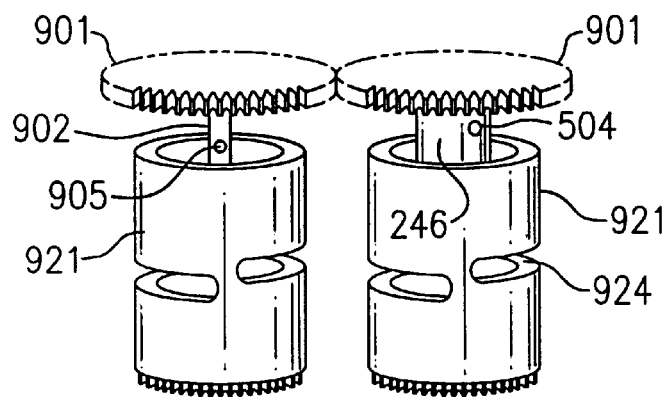
Figure 12C:
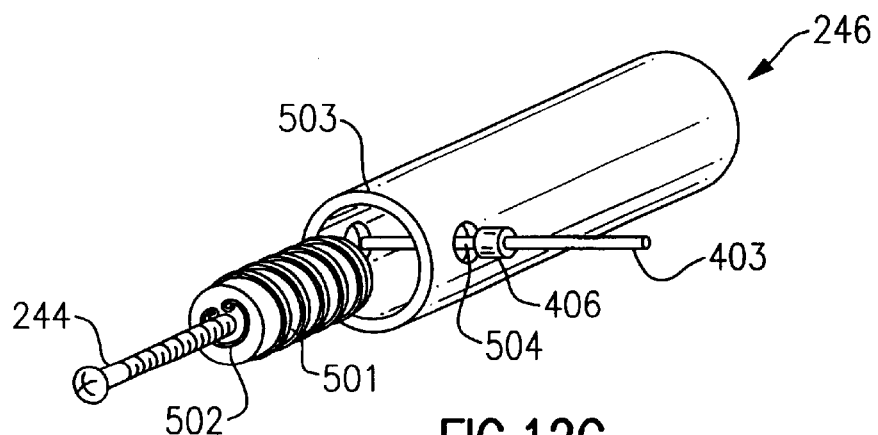
Figure 13:
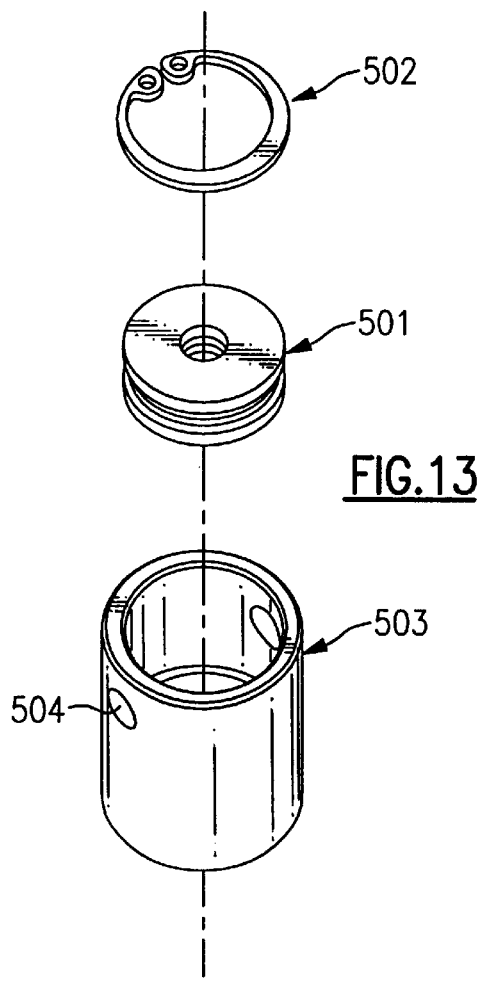
FIG. 13 is a parts diagram for the bearing cup assembly of the cam/clutch system.

Referring to FIGS. 1, 2 and 3, electric actuator 10, which can be designed to deliver virtually any required torque, comprises energy storage, operational, and fail-safe subsystems which operate in conjunction to provide full clockwise or counterclockwise positioning of, for example, a damper or valve, through output shaft 11. Actuator 10, to accommodate the functionality embodied in the three possible subsystems, has at least tri-modal capability. This capability is provided by the dual clutch/cam mechanism depicted in FIGS. 11–16. Components of actuator 10 that provide energy storage mode are depicted in FIGS. 4–7 and those that depict fail-safe mode are depicted in FIGS. 8–10.

Referring now to FIGS. 11–16, tri-modal capability is accomplished by virtue of the fact that each of the dual clutches can be in one of two possible gears, thus indicating up to four possible modes: both up, both down, left up/right down, and right up/left down. "Up" and "down" indicate the position of clutch body 401 on clutch assembly shaft 402 at any given time. Pin 403 indicates modality as follows: referring to FIG. 12A, when pins 403 are positioned at 120° position 450 within circumferential cam slots 924, actuator 10 is in run mode. When pins 403 are positioned at 65° position 452 within circumferential cam slots 924, actuator 10 is in energy storage mode, and when pins 403 are positioned at 0° position 454 within circumferential cam slots 924, actuator 10 is in fail-safe mode.

Figure 14:
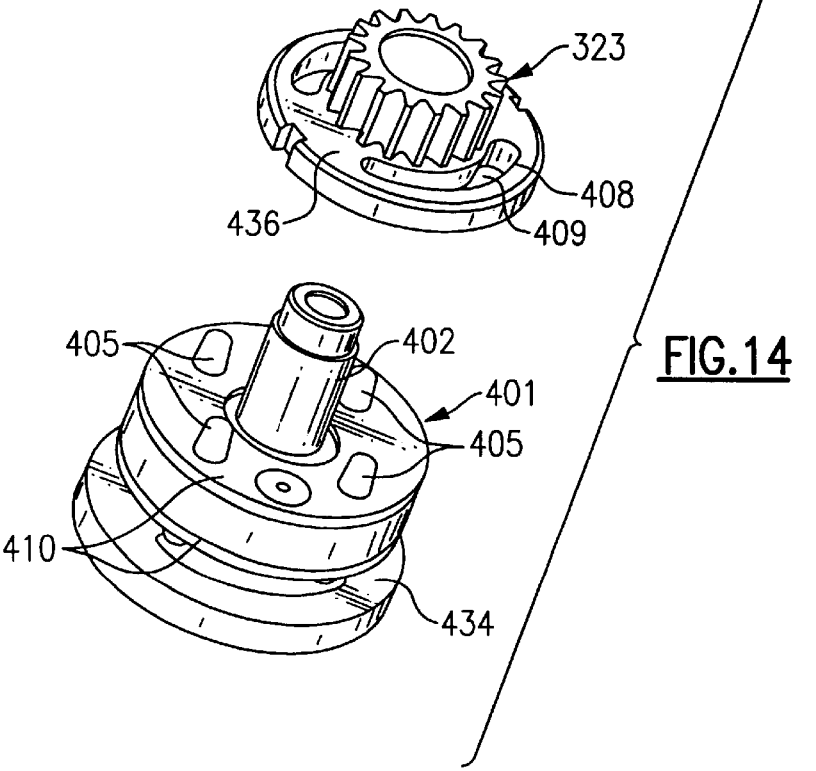
FIG. 14 is a detailed diagram for the clutch assembly including clutch pin geometry view.
Figure 15:
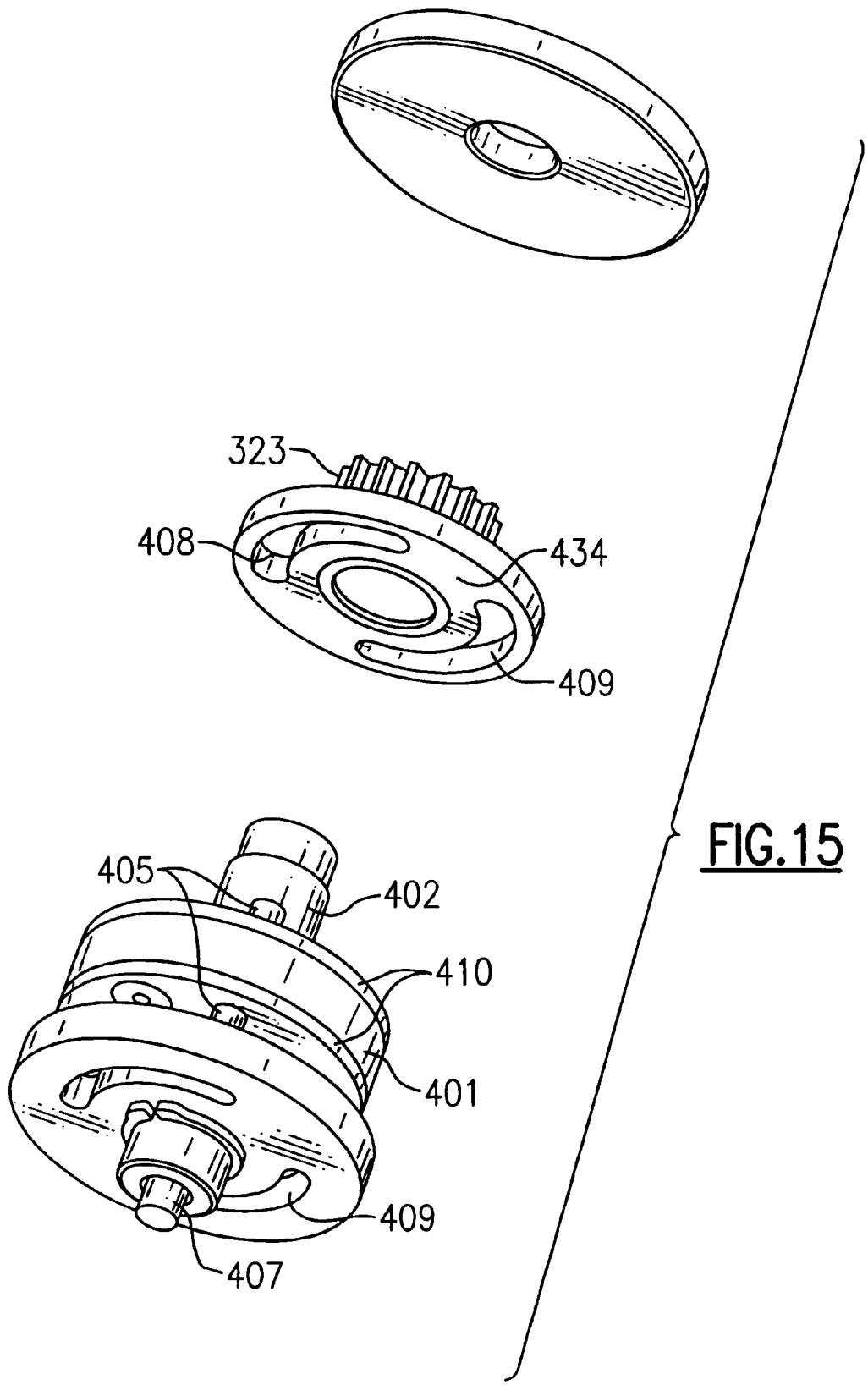
FIG. 15 is a detailed diagram for the clutch assembly viewed from a different perspective from FIG. 14.
Figure 16:
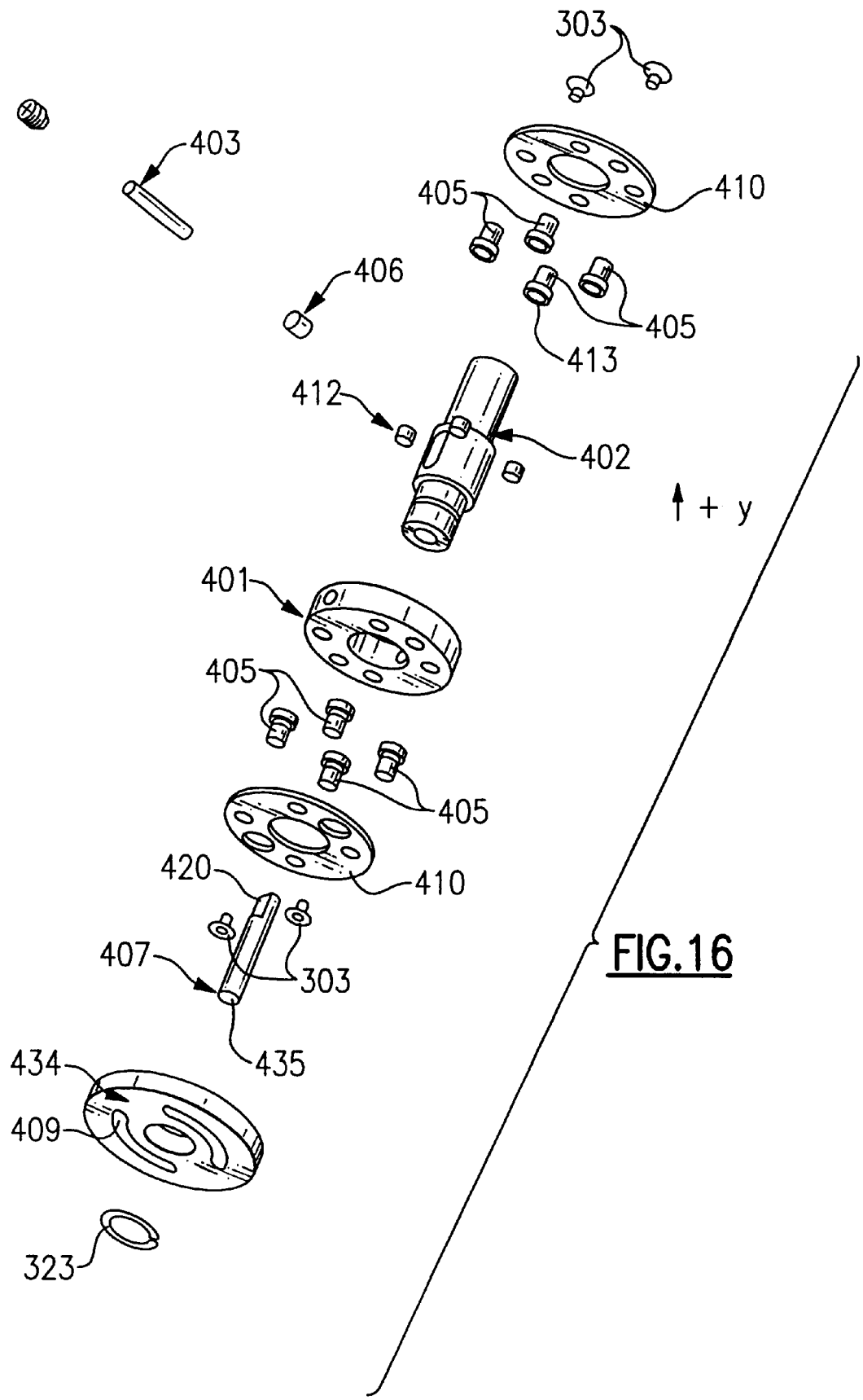
FIG. 16 is a parts diagram for the clutch assembly.

Other features of the novel cam/clutch configuration are as follows. Referring to FIGS. 14–16 clutch pins 405 are tapered and slots 409 are also tapered in the direction 408 of pinion output gears 323. Each clutch body assembly comprises disc-shaped clutch body 401 having retractable tapered pins 405, secured between an upper and a lower plates 410 by screws 303. Pins 405 can be any size, but must be tapered at an angle of 3–7°, depending upon the surface finish. Also comprising each clutch body assembly are clutch pin receiver plates 434 floatably disposed along clutch assembly shaft 402. Clutch body 401, clutch assembly shaft 402, and clutch rod 407 are recessed with roller recesses 420 large enough to accept pin 403 and rollers 406. Clutch receiver plates 434 are recessed with slots 409 to accept clutch pins 405, the seating of which clutch pins 405 subsequently engages gears. Thus, retractable clutch pins 405 can be properly seated in slots 409 more quickly than if clutch pins 405 were each required to mate with an analogous hole in receiver plate 434. When clutch pins 405 are seated in slots 409, they remain so seated until gear shifting occurs. However, because clutch pins 405 are not required to exactly match identically-sized holes in clutch pin receiver plate 434, gear shifts can be accomplished much more quickly with slots 409. Additionally, clutch pins 405 have at their bases spring recesses 413 which house clutch pin springs 412. Thus, when clutch pins 405 are attempting to engage with slots 409, but when they are flush with the non-slotted parts of clutch pin receiver plate 434, clutch pins 405 retract to enable smoother and quicker gear transitions. Clutch body 401, mounted upon clutch rod 407, houses clutch pin springs 412 and, when they are retracted, clutch pins 405. Sequencing of modes, powering the cam/clutch mechanism to switch from energy storage to run mode, is cam motor 107. Cam bodies 921, covered during operation by cam covers 112, and bearing cup 503 are slotted with openings that must be large enough to house pins 403 and rollers 406. In the preferred embodiments, cam body slot 924 extends over half of the circumference of cam body 921. Pins 403 are narrow cylinders, in the preferred embodiment, and roller 406 are fabricated to be slidably disposed upon pins 403 enabling low-friction insertion of pins 403 into slots 924 and recess 504.

Figure 17A:
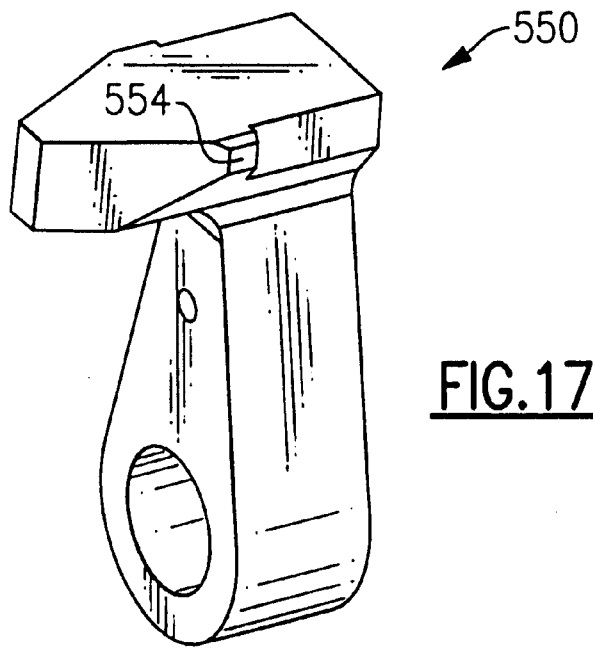
FIGS. 17A and 17B are two views of the anti-backwinding pawl.
Figure 17B:
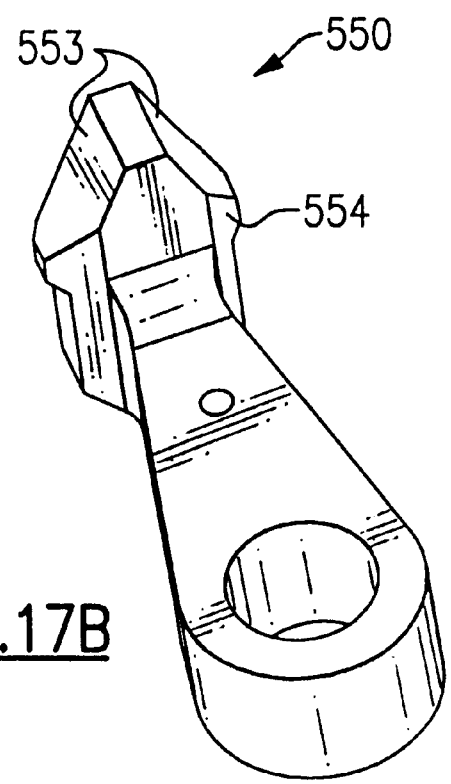

Note that pressure from the device that actuator 10 is positioning could cause float of the cam/clutch mechanism while one clutch is in "up" position (during fail-safe or power storage mode). To prevent this unwanted movement, and referring now to FIGS. 1 and 17, anti-backwinding pawl 550 engages with one of a plurality of notches 551 in lower clutch pin receiver plate 436. Head 553 of pawl 550 is fabricated symmetrically so that pawl 550 can be used for both lower clutch pin receiver plates 436 in right- or left-handed positions. Edges 554 are squared so that the downward movement of clutch body 401 releases pawl 550 so that receiver plate 436 can spin freely to accept clutch pins 405 and thus switch modes.

Referring now to FIGS. 4–7, power storage subsystem components are power spring 702, cam spring 1702, cam motor 107, and motor 105. Note that motors 105 and 107 can be any source of power, and springs 702 and 1702 can be any means for energy storage. In this mode, both cam spring shaft 102 and main spring shaft 101 wind their respective springs 1702 and 702. Cam motor 107, the operations sequencing motor, also winds cam spring 1702 during energy storage mode. Motor 105, the operational motor, also winds main spring 702 during energy storage mode. When cam spring 1702 is completely wound, and referring now to FIGS. 4A, 4B, 5A, and 5B, its high energy state is maintained by its physical position with respect to worm gear 650. FIGS. 4B and 5B illustrates cam spring 1702 in high energy state, i.e. worm gear 650 is adjacent to cam spring 1702, thus maintaining its wound condition. When main spring 702 is completely wound, motor 105 turns off, cam motor 107 again turns on, the cams move the clutches into run mode, i.e. the clutches are in the opposite up/down position from fail-over mode, and then motor 105 turns back on to begin operational positioning. Main spring 702 is completely wound when pre-load spring 150 reaches a certain tension that causes micro-switch 151 to be tripped. High energy state in main spring 702 is maintained as a result of the interlocking of pawl 2201 with the toothed edge 552 of clutch pin receiver plate 434 as in FIGS. 6 and 7. In the preferred embodiment, and referring now to FIG. 7, pawl 2201 is comma-shaped, comma nib 2203 having a flattened, but thick, edge which fits between the teeth of toothed edge 552 to prevent backwinding of the gear, and thus retains main spring 702's stored energy until fail-safe operation.

Operational mode, the mode in which the actuator is running normally, begins when main spring 702 is completely wound and pawled. Cams 921 and clutches 401, the mechanisms by which actuator 10 operates in one of its possible modes, are operationally interconnected through bearing cup assemblies 246. Cam pin driver 902 is recessed 905 to accept the head of retaining screw 244, thus allowing for a linear response in bearing cup assembly 246. Operationally, dual cams are driven by cam motor 107 through gears 901 mounted on cam pin drivers 902 which rotate in directions opposite each other, thus providing a rotative response, or torque, in bearing cup assembly 246. While rotating, cam pin drivers 902 drive pins 403 through rollers 406 which follow cam slots 924. Bearing cup assemblies 246 are forced up or down by the cams. The force is supplied by thrust bearings 501, which, in the preferred embodiment, are trapped between bearing retainer clips 502 and clutch actuators within bearing cup 503. In the preferred embodiment, bearing retainer clip 502 is a non-joining circularly-shaped single-wire spring clip. Thrust bearings 501, attached to clutch rods 407, when moving in the −y direction apply a force on clutch rods 407, or when moving in the +y direction, referring to FIG. 16, apply a force on retainer screws 244, which in turn pull clutch rods 407. Clutch rods 407 maintain the vertical (y-direction) position between the cams and clutch bodies 401 by means of the previously-described forces and by pins 403 and rollers 406 which fit into recesses 420 in clutch bodies 401.

Figure 4A:
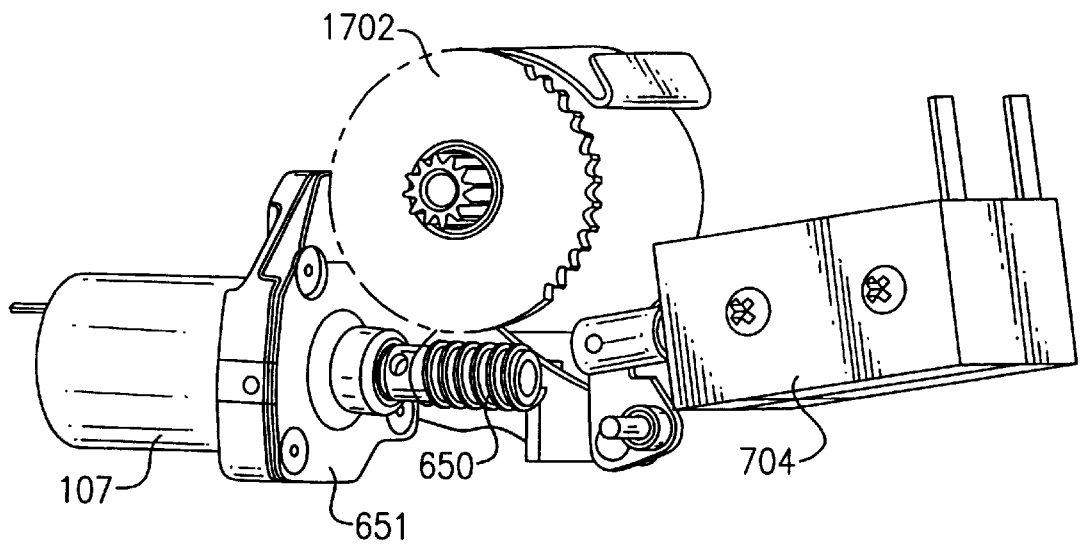
FIGS. 4A and 4B are worm gear/cam spring coupling top views showing the cam spring in high energy mode (FIG. 4B) and low energy mode (FIG. 4A).
Figure 4B:
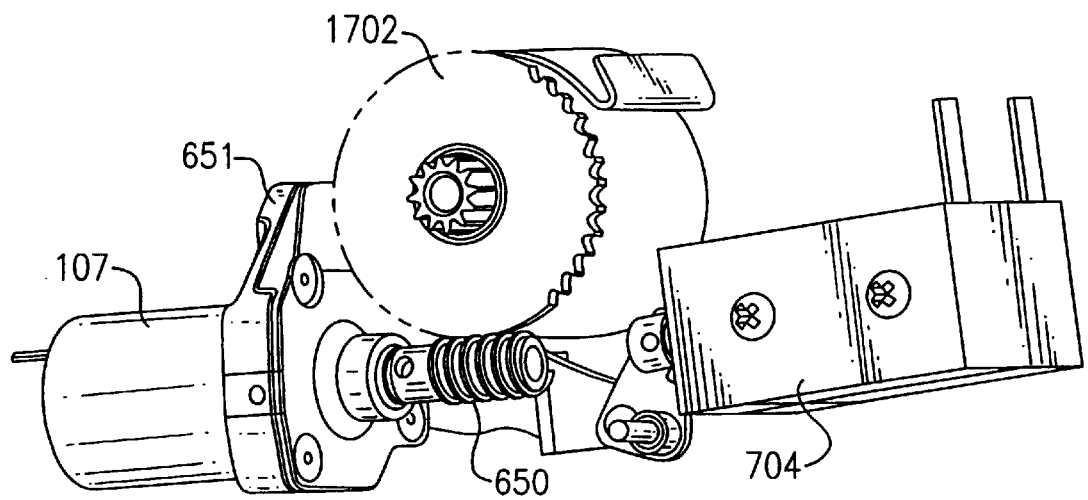
Figure 5B:
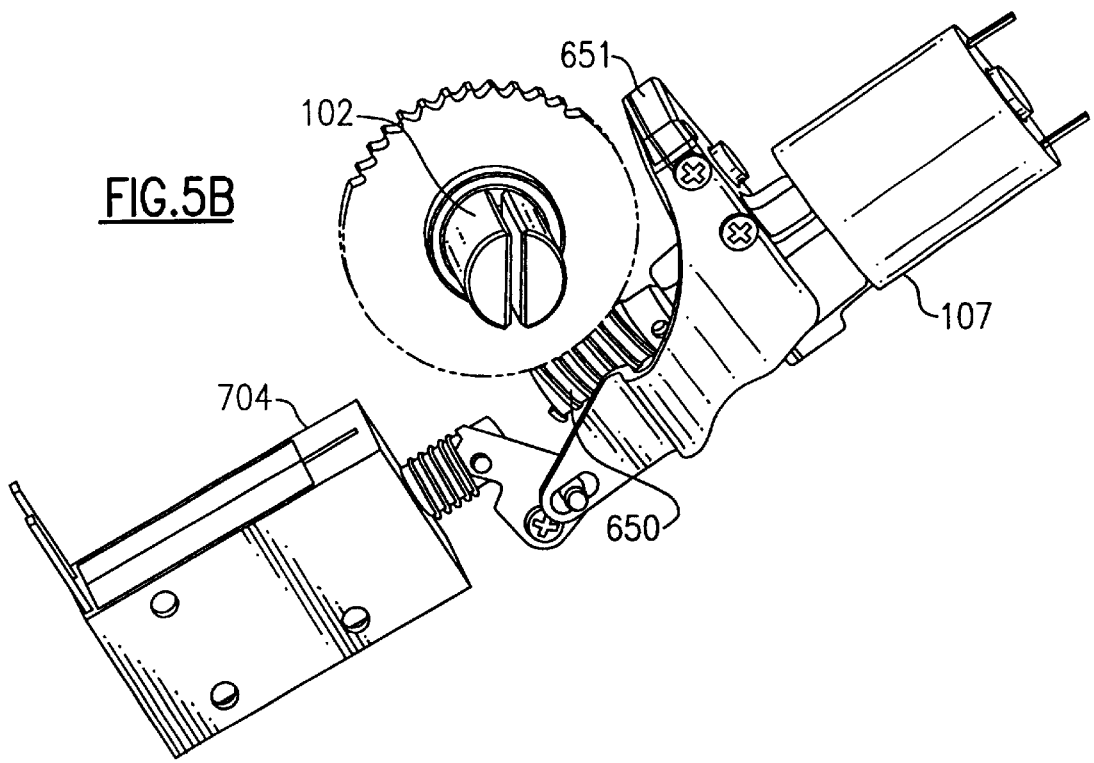
FIGS. 5A and 5B are worm gear/cam spring coupling top angles perspective views showing the cam spring in high energy mode (FIG. 5B) and low energy mode (FIG. 5A).
Figure 5A:
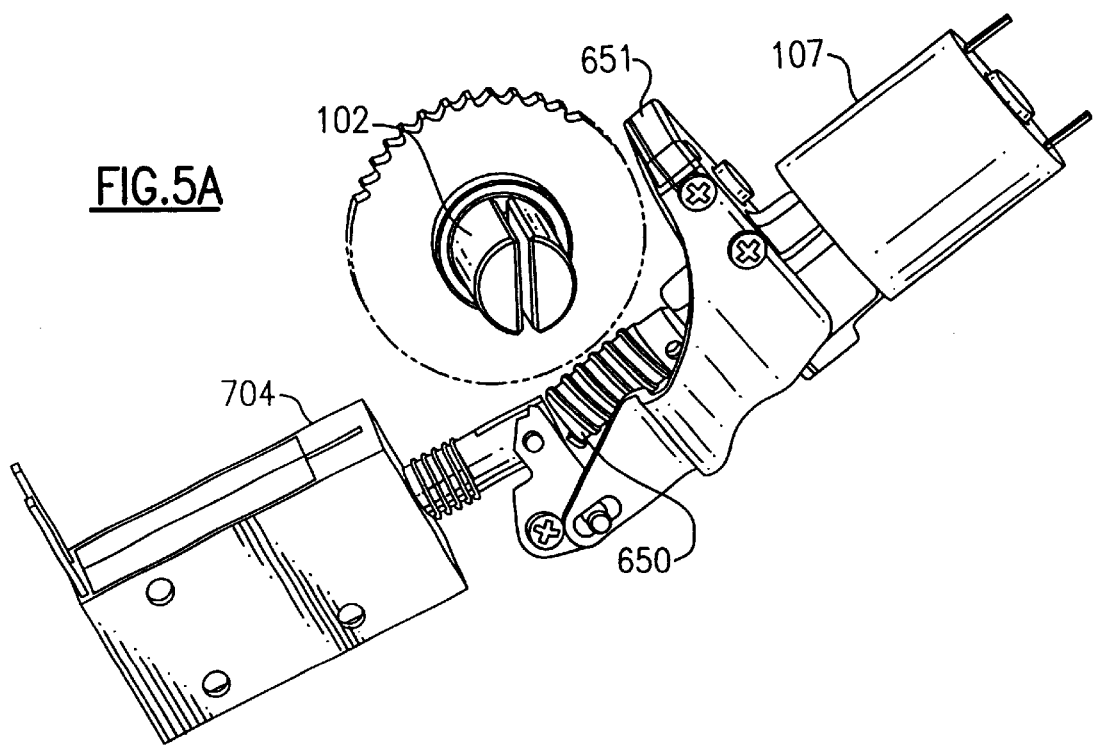
Figure 6:
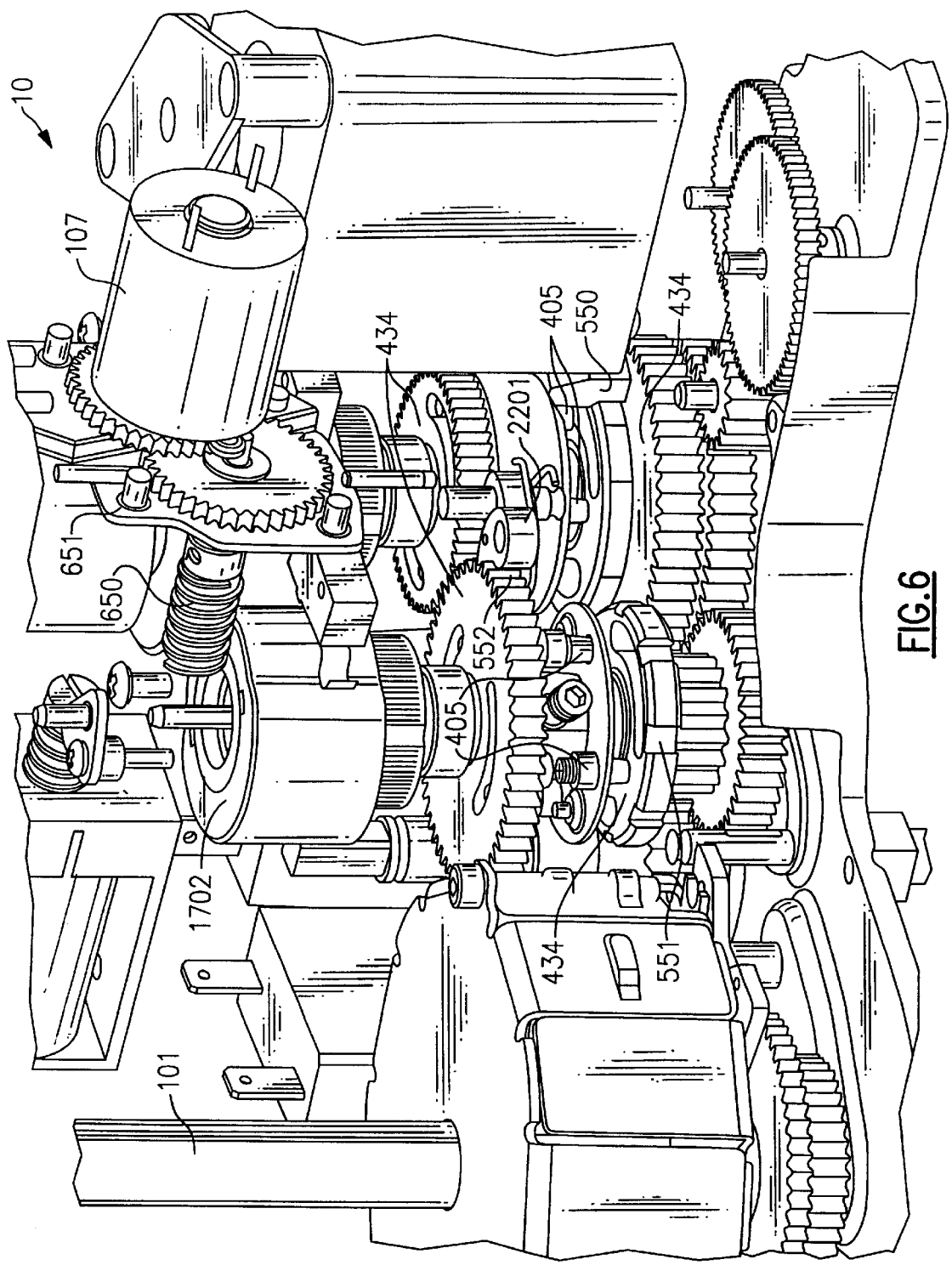
FIG. 6 is a perspective diagram of the internals of the actuator featuring the main spring pawling system in high energy mode (pawl engaged in toothed edge of upper clutch pin receiver plate).
Figure 7:
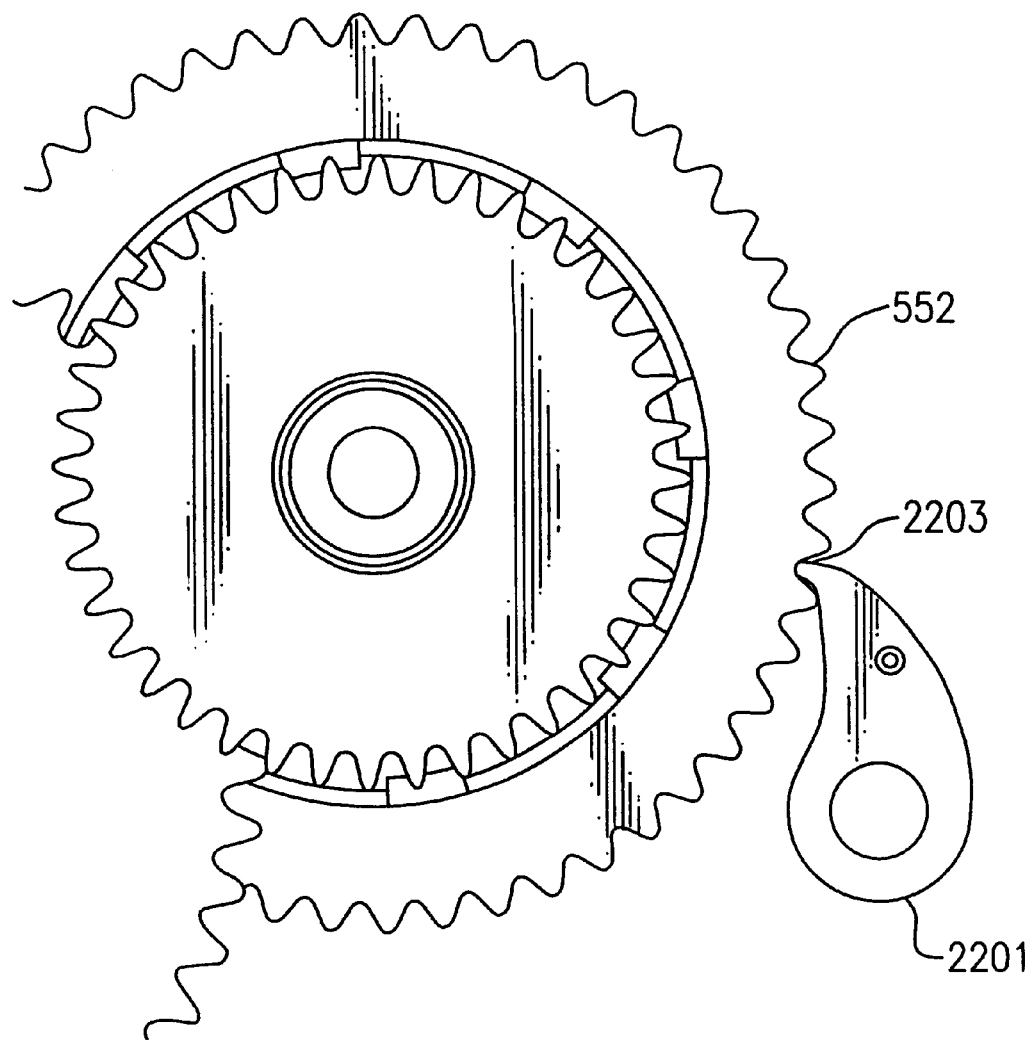
FIG. 7 shows the geometry of the pawl of the preferred embodiment that accomplishes powerless energy storage in the main power spring.

Referring to FIGS. 8, 9, and 10, during fail-safe mode, which usually involves some type of power interruption, the cam/clutch and pin/roller configurations reflect this mode as described above, and fail-safe subsystem components control actuation. Referring to FIGS. 4A and 5A, first, solenoid 704 triggers worm gear 650 out of its pawled, energy storage, condition. Cam spring 1702 is released, which signals to the cam/clutch mechanism to change gears, and thus enables the unwinding of main spring 702. At this point, main spring 702 reverses the movement of shaft 11 at the rate that main spring 702 could unwind. Since it might not always be desirable or possible to release energy at that high a rate, in the preferred embodiment, and referring to FIGS. 1, 8, and 9, escapement 2301 can be used to adjust spring 702's discharge rate. Alternately, escapement 252, referring to FIG. 10, can be used for the same purpose. Escapement 2301 comprises a clockworks-type mechanism with a substantially triangularly-shaped cavitied 2321 plate that is notched 2303. Adjacent to the cavitied plate is an indexing/positioning shaft 2313 having, upon its circumference, escapement nub 2311. During normal operations, nub 2311 rests in notch 2303, but during fail-safe mode, escapement 2301 rocks between main spring 702 and drive gear 2323, which interlocks with cog wheel 2305 through gear 2307. During fail-safe mode, main spring shaft 101, underlain by plate 2401, begins to unwind. In the process, escapement 2301 is nudged, which in turn nudges drive gear 2323. The discharge rate of main spring 702 is controlled by the rate at which escapement 2301 rocks, which is controlled by flywheel 2309 underlain by and attached to control springs 1703. Escapement 2301 must drag along flywheel 2309 and control springs 1703 as it rocks. Thus the size of these control devices determines the rate at which energy is discharged.

Another escapement geometry comprises ramp gear 250 which is attached to spring shaft 101. Ramp gear 250 is a large-toothed disk falbricated to engage and temporarily interlock with escapement 252 through escapement 252's rocking motion. Escapement 252 is fabricated with two teeth, one near each end in the preferred embodiment, for interlocking with escapement 252 which is designed to operate in conjunction with ramp gear 250 and with gear 254 which is engaged at outer edge 260 of escapement 252. As main spring shaft 101 unwinds, escapement 252 teeth become alternately engaged at one end of escapement 252, disengaged completely, and then engaged at the other end of escapement 252 with ramp gear 250. During this cycle, gear 254 alternately engages and disengages with escapement edge 260, providing resistive inertia that slows the rotative speed of the escapement. As spring 702 unwinds, spring gear 13, which interlocks with drive gear 2323, moves shaft 11 at the desired energy discharge rate.

It should be understood that the invention is not limited to simply actuator applications, but the same system, apparatus or device may be used for any type of clutched, fail-safe, spring-driven application. The uses expressly noted and suggested inferentially and otherwise, and the various methods of use and many of the invention's attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

I claim:

1. A fail-safe electrically operated actuator having a spring return backup in the event of an electrical power failure to the actuator, the actuator comprising:
   an electric power input supplied to an electric motor connected through a clutch to drive an actuator output during a first mode of operation;
   a main spring connected through the clutch to drive the actuator output in a second mode of operation; and
   wherein in the first mode of operation the electric motor is directly connected through the clutch solely to the actuator output and drives the output, and in the second mode of operation the main spring is directly connected through the clutch solely to the output to drive the actuator.

2. The fail-safe electrically operated actuator as set forth in claim 1 wherein in a third mode of operation the electric motor is directly connected through the clutch solely to the main spring to wind the main spring into an energy storage capacity.

3. The fail-safe electrically operated actuator as set forth in claim 2 wherein the clutch comprises a first clutch body and a second clutch body and in the first mode of operation power the electric motor drives the actuator output solely through the first clutch body and in the second mode of operation the main spring drives the actuator output at least through the second clutch body.

4. The fail-safe electrically operated actuator as set forth in claim 3 wherein during the third mode of operation the electric motor is directly connected solely to the main spring through the first and the second clutch bodies to wind the main spring into an energy storage capacity.

5. The fail-safe electrically operated actuator as set forth in claim 4 wherein the first and second clutch bodies are each provided with a respective first and second clutch disks moveable between a respective first and second clutch plates and during the first, second and third modes each clutch disk is continuously engaged with one of the first and second clutch plates.

6. The fail-safe electrically operated actuator as set forth in claim 5 wherein the first clutch plate of the first clutch body is drivingly engaged with the first clutch plate of the second clutch body and the second clutch plate of the first clutch body is drivingly engaged with the second clutch plate of the second clutch body.

7. The fail-safe electrically operated actuator as set forth in claim 6 further comprising an axially moveable first and second clutch shafts to which the respective first and second clutch disks are axially moveable and rotationally affixed, the first and second clutch shafts being rotationally moveable relative to the respective first and second clutch plates which are supported about each clutch shaft to provide engagement of the axially moveable first and second clutch disks with one of the respective first and second clutch plates.

8. The fail-safe electrically operated actuator as set forth in claim 7 wherein in the first mode of operation the first clutch disk is engaged with the respective second clutch plate which directly drives solely the actuator output and the second clutch disk is engaged with the respective first clutch plate.

9. The fail-safe electrically operated actuator as set forth in claim 8 wherein during the second mode of operation the first clutch disk is engaged with the respective first clutch plate and the second clutch disk is engaged with the respective second clutch plate and the main spring is directly connected through the second clutch body to drive solely the actuator output in one of the first and second direction.

10. The fail-safe electrically operated actuator as set forth in claim 9 wherein during the third mode of operation the first clutch disk remains engaged with the respective first clutch plate and the second clutch disk is engaged with the respective first clutch plate and the electric motor is directly connected solely to the main spring through the engaged first clutch plates to wind the main spring into energy storage capacity.

11. A switching mechanism for changing between a first source and a second source providing operating power through a transmission to an output, the switching mechanism comprising:

a first mode of operation having the first source connected to and supplying operating power through the transmission directly to the output;

a second mode of operation having the second source connected to and supplying operating power through the transmission directly to the output;

a third mode of operation having the first source connected to and supplying operating power through the transmission directly to the second source to raise the potential energy of the second source; and wherein the transmission provides a different mechanical pathway for each of the first, second and third modes of operation which are accomplished independent and separate from one another.

12. A fail-safe electrically operated actuator having a spring return backup in the event of an electrical power failure to the actuator, the actuator comprising:

an electric power input supplied to an electric motor connected through a clutch to drive an actuator output during a first mode of operation;

a main spring connected through the clutch to drive the actuator output in a second mode of operation; and wherein in the first mode of operation the electric motor is directly connected through the clutch solely to the actuator output and drives the output, and in the second mode of operation the main spring is directly connected through the clutch solely to the output to drive the actuator;

a third mode of operation the electric motor is directly connected through the clutch solely to the main spring to wind the main spring into an energy storage capacity;

a first clutch body and a second clutch body and in the first mode of operation power the electric motor drives the actuator output solely through the first clutch body and in the second mode of operation the main spring drives the actuator output at least through the second clutch body; and wherein the first and second clutch bodies are each provided with a respective first and second clutch disks moveable between a respective first and second clutch receiver plates and during the first, second and third modes each clutch disk is continuously engaged with one of the first and second clutch receiver plates.

13. The fail-safe electrically operated actuator as set forth in claim 12 further comprising at least a pin receiving slot formed in each of the first and second clutch receiver plates for accepting a respective first and second pins affixed to both of the first and second clutch disks.

14. The fail-safe electrically operated actuator as set forth in claim 13 wherein the first and second pins affixed to both the first and second clutch disks are provided with an engagement surface having a tapered profile to facilitate engagement and disengagement with the pin receiving slots formed in each of the first and second clutch receiver plates.

15. The fail-safe electrically operated actuator as set forth in claim 14 wherein the pin receiving slots formed in each of the first and second clutch receiver plates are provided with a receiving surface defining a corresponding tapered profile of about 3–7 degrees relative to the first and second pins to further facilitate engagement and disengagement of the pin with the respective receiving slot under a load.

16. The fail-safe electrically operated actuator as set forth in claim 12 further comprising a first and second cam for biasing the respective first and second clutch disks into continuous engagement with one of the first and second clutch receiver plates.

17. A method of providing a fail-safe electrically operated actuator having a spring return backup in the event of an electrical power failure to the actuator, the method comprising the steps of:

supplying electric power to an electric motor connected through a clutch to drive an actuator output during a first mode of operation;

connecting a main spring through the clutch to drive the actuator output in a second mode of operation; and in the first mode of operation directly connecting the electric motor through the clutch solely to the actuator output and driving the output, and in the second mode of operation directly connecting the main spring through the clutch solely to the output to drive the actuator.

18. The method of providing a fail-safe electrically operated actuator as set forth in claim 17 further comprising a third mode of operation directly connecting the electric motor through the clutch solely to the main spring to wind the main spring into an energy storage capacity.

19. The method of providing a fail-safe electrically operated actuator as set forth in claim 18 further comprising the step of independently executing the first, second and third modes of operation.

20. The method of providing a fail-safe electrically operated actuator as set forth in claim 18 further comprising the step of providing the clutch with a first clutch body and a second clutch body and in the first mode of operation the electric motor drives the actuator output solely through the first clutch body and in the second mode of operation the main spring drives the actuator output at least through the second clutch body while under a load.

* * * * *